United States Patent [19]

Pattengill et al.

[11] Patent Number: 5,441,760
[45] Date of Patent: Aug. 15, 1995

[54] IMPREGNABLE IN SITU DEICING MATERIAL

[75] Inventors: Maurice G. Pattengill, Golden; Martin A. Jones, Boulder, both of Colo.

[73] Assignee: Western Aggregates, Inc., Boulder, Colo.

[21] Appl. No.: 218,073

[22] Filed: Mar. 25, 1994

[51] Int. Cl.⁶ .......................... B05D 5/00; C09K 3/18
[52] U.S. Cl. .................................... 427/138; 427/136; 427/140; 427/421; 427/427; 106/13; 106/281.1; 106/681; 106/718; 106/811; 106/DIG. 7; 252/70
[58] Field of Search ...................... 252/70, 71; 106/13, 106/DIG. 7, 681, 718, 811, 281.1; 427/136, 138, 140, 421, 427

[56] References Cited

U.S. PATENT DOCUMENTS

| | | | |
|---|---|---|---|
| 4,012,537 | 3/1977 | Dubois | 106/13 |
| 4,296,207 | 10/1981 | Seigmund | 521/53 |
| 4,692,259 | 9/1987 | Roman | 252/70 |
| 5,114,475 | 5/1992 | Siegmund et al. | 106/13 |

FOREIGN PATENT DOCUMENTS

| | | | |
|---|---|---|---|
| 22055 | 1/1981 | European Pat. Off. | 106/13 |
| 2512691 | 9/1976 | Germany | 106/13 |
| 60-199501 | 8/1985 | Japan | 106/13 |
| 1-163285 | 6/1989 | Japan | 106/13 |
| 546679 | 2/1977 | U.S.S.R. | 106/13 |

OTHER PUBLICATIONS

"Ice-Resistant Pavement" Research Project HR290, Nov. 1991, Iowa Dept. of Transportation pp. 1-9.

*Primary Examiner*—Anthony Green
*Attorney, Agent, or Firm*—Edward A. Steen

[57] ABSTRACT

A chipseal overlay coating having in situ deicing properties. An absorbent material such as lightweight aggregate, is mixed with oil, asphalt and/or concrete to form a thoroughfare chipseal overlay. Deicing materials are applied to the overlay or to the absorbent material prior to the mixing process. Due to the highly absorbent nature of the chipseal overlay, the deicing material is absorbed. During icing and snow conditions, the impregnated material reacts with the ice and snow to cause them to melt.

6 Claims, No Drawings

IMPREGNABLE IN SITU DEICING MATERIAL

TECHNICAL FIELD

The instant invention relates to road maintenance in general and, more particularly, to a renewable source of deicing and traction enhancing material embedded in a road surface.

BACKGROUND ART

In order to maintain paved thoroughfares, such as roadways, runways, ramps, walkways, sidewalks, parking lots, etc. clear from snow and ice, deicers such as sodium chloride and traction enhancers such as sand, either singly or in combination, are applied to the surface. The objectives being to melt the frozen water by depressing its melting temperature and/or provide a tractive medium over the slippery thoroughfare. Under non-extreme conditions, sodium chloride is generally sufficient to melt snow and ice.

Typically, sand, cinders, stone, chips, etc. are added to the salt in varying ratios to enhance the capabilities of the treatment material.

Other compounds have been substituted for sodium chloride with varying degrees of success. Examples include calcium chloride, magnesium chloride, potassium chloride, magnesium acetate, calcium acetate and calcium magnesium acetate.

These agents must be physically applied to the roadway on a periodic basis. Road traffic, plowing and the physical melting of the snow and ice inexorably remove the agents from the area being treated thereby reducing the effectiveness of the treatment. As a consequence, repeated applications of the materials with the attendant fiscal and environmental costs are required.

In an attempt to overcome problems associated with repeated applications of deicing materials, the Iowa Department of Transportation placed an experimental asphaltic concrete overlay containing an ice retardant additive called Verglimit® consisting primarily of deicing salts and sodium hydroxide over an existing road. The results are set forth in the bulletin entitled "Ice-Retardant Pavement", Research Project HR290, November 1991.

The results were apparently disappointing. Due to the hydrophilic nature of the material, the road surface became slippery since it tended to retain surface moisture. "Because of the problems with wetting of the pavement surface during periods of high humidity, the limited climatic conditions under which the ice-retardant overlay performs, it[s] limited deicing potential and it[s] high cost, it is doubtful the City of Des Moines would place an[o]ther ice-retardant overlay"—Page 9.

SUMMARY OF THE INVENTION

Accordingly, there is provided a chip seal overlay formulation having a renewable in situ source of deicing material. An overlay mixture including lightweight expanded shale aggregate is spread over a surface to be treated. A deicing solution is applied to the overlay. The solution is absorbed by the embedded aggregate. During icing conditions the entrained deicer seeps out of the aggregate to melt the ice and snow.

PREFERRED MODE FOR CARRYING OUT THE INVENTION

Assignee manufactures Realite® lightweight expanded shale aggregate. Main uses for this material are concrete, concrete blocks, road surfaces and other typical sand and gravel applications.

Realite aggregate is made from shale quarried from deposits immediately south of the Boulder County/Jefferson County line in Colorado. The shale is crushed to various selected sizes and is heated in a rotary kiln to approximately 1093° C. (2000° F.). The shale partially melts causing some of its components to vaporize. The liberated gases are trapped within the molten shale causing the material to form internal interstices and to approximately double its original size. As the material cools, it hardens into a pellet having a highly porous structure. The resultant aggregate is lightweight and durable. Due to porosity, it can absorb in excess of 30% of its weight in liquids.

The shale found in the above discussed deposit has the following typical analysis (in weight percent):

| Constituent | Wt % Dry Basis |
| --- | --- |
| $SiO_2$ | 61.05 |
| $Al_2O_3$ | 14.41 |
| $Fe_2O_3$ | 5.36 |
| $CaO$ | 2.88 |
| $MgO$ | 2.76 |
| $K_2O$ | 2.78 |
| $Na_2O$ | 1.13 |
| $SO_3$ (Total) | 1.71 |
| $P_2O_5$ | 0.18 |
| $TiO_2$ | 0.57 |
| $Mn_2O_3$ | 0.11 |
| (1)Loss at 900° C. | 0.05 |

(1)Carbon —$CO_2$-Water

Upon completion of the heat treatment, the aggregate has the following typical composition (in weight percent):

| Component | Wt % Dry Basis |
| --- | --- |
| $SiO_2$ | 66.32 |
| $Al_2O_3$ | 15.88 |
| $Fe_2O_2$ | 5.92 |
| $CaO$ | 2.92 |
| $MgO$ | 2.97 |
| $K_2O$ | 3.09 |
| $Na_2O$ | 1.29 |
| $SO_3$ | 0.66 |
| $P_2O$ | 0.20 |
| $TiO_2$ | 0.63 |
| $Mn_2O_3$ | 0.12 |
| (1)Loss at 900° C. | 0.05 |

(1)Carbon

Specific sections or entire chip seal roadways consisting of the lightweight aggregate may be sprayed with a suitable deicing solution—$CaCl_2$, $MgCl_2$, $NaCl$, etc. The deicing solution is absorbed into the chip seal pore spaces. The deicing solution from the pore spaces contacts ice or packed snow on the road surface and commences melting.

In order to determine the effectiveness of the instant chip seal mixture, a series of test plates were fabricated containing aggregate coarse chips imbedded in an asphalt emulsion. The chips were sprayed with various solutions. The plates were frozen and heated at sub-freezing temperatures. Physical characteristics were measured.

The thrust of the test program was to investigate the deicing and surface coefficient of static friction ("CSF") properties of a treated Realite® light weight aggregate coarse chip seal. On a typical roadway the chip seal particles are basically worn down to flat irregular surfaces that are even with or partially extrude out of the asphalt emulsion base. These flat surfaces can be fully, partially, or totally free of asphalt impregnation. The majority of these surfaces are devoid of asphalt and possibly could be amenable to absorb water and deicing chemical solutions into the coarse chip seal pores. However, it was unknown if any absorbed deicing chemical solutions would have a positive, i.e., melting, effect on road surface ice. Also it was unknown as the extent the chip treatment would affect the coefficient of static friction on a chip seal road surface. These unknown factors were investigated in the test program.

The basic tests were conducted on four 15 inch × 15 inch (38.1 cm × 38.1 cm) chip seal coated test plates. As received, the plates were unacceptable for testing because the majority of the chip mass protruded out of the asphalt emulsion in its original processed shape. Therefore the four plates were placed on a roadway and were subjected to dynamic compaction by the tires of front end loaders. Subsequent visual inspection revealed that the plates were beginning to conform to a typical chip seal road surface. All the plates were removed and set ahead of a plant truck scale and in the path of truck tires. The plates were exposed to truck traffic for over two days.

Although the chips were driven into the asphalt, the protruding chips were still very irregular in shape and did not display the typical worn flat surface. After the plates were oven dried overnight at 150° F. (65.5° C.) a test path of about 5 inches × 15 inches (12.7 cm × 38.1 cm) was ground into the chip seal surface. The grinding produced a flat surface on the protruding chips which is comparable to a chip seal roadway. Finally after this treatment the plates were acceptable for testing.

The testing regimen is discussed below in greater detail:

(1) Chip Seal Test Plates (Four)

The test plate base was a ½ inch (1.3 cm) carbon steel plate measuring 15 inches × 15 inches (38.1 cm × 38.1 cm). A ¼ inch (0.64 cm) round was welded on top and around the perimeter of a plate in order to form an enclosure to retain the coarse chips and asphalt emulsion. The size of the coarse aggregate was 100% passing ⅜ inch (0.95 cm) and 5% passing 4 mesh (9.76 mm). Forty percent of the test plate area, i.e., asphalt emulsion, was embedded with coarse chips.

(2) Chemical Solutions and Water

The first solution was formulated by mixing 91% Dow Chemical $CaCl_2$ prills with non-potable plant water. A total of 4.76 kg (10.49 lbs.) of Dow $CaCl_2$ prills were dissolved in 10.0 liters (22.04 lbs.) of non-potable plant water. This solution had a theoretical eutectic point at $-57.6°$ F. ($-49.8°$ C.) to yield ice and $CaCl_2 6 \cdot H_2O$.

The second solution was comprised of 98% pure Great Salt Lake Materials and Chemical Corp. $MgCl_2 6H_2O$ flake. A total of 8.3 kg (18.32 lbs.) of $MgCl_2 6H_2O$ flake were dissolved in 10.0 liters (22.05 lbs.) of non-potable plant water. This solution had a theoretical eutectic point at $-28.5°$ F. ($-33.6°$ C.) to produce ice and $MgCl_2 12H_2O$.

The third solution was comprised of rock salt (halite—NaCl) and non-potable plant water. The rock salt purity Was assumed to be 98.2%. A total of 3.10 kg (6.83 lbs.) of rock salt were dissolved in 10.01 (22.05 lbs.) of non-potable plant water. This solution had a theoretical eutectic point at $-6.02°$ F. ($-21.12°$ C.) to produce ice and $NaCl2H_2O$.

Non-potable plant water was used as the fourth sorption liquid.

(3) Freezing Facility

The freeze/thaw and coefficient of friction determination tests were conducted in typical highway refrigeration trailer unit. Utilities such as electric power and compressed air lines were supplied to the inside of the trailer via floor ports. The CSF values were measured on a friction skid supplied with the appropriate electronic equipment known to those in the art.

Test Procedures:

(1) Chip Seal Test Plate Preparation

In order to make the test plates compatible for the test program, they were subjected to dynamic tire compaction from moving front-end loaders and aggregate hauling tractor-trailer trucks. Although the coarse chips became firmly imbedded in the asphalt emulsion, the rough protruding chips had to be ground in order to present more or less flat horizontal surface by the exposed chips. This type of surface is displayed by the roads that are coated with the coarse chip seal and are eventually worn down.

After the plates were subjected to rough tire traffic, sections of the chip and asphalt were dislodged from the plates. Some sections of the plates had severe asphalt smearing on the chips. Because of these plate conditions, the best test path had to be selected for a given plate. A path dimension was 5 inches wide × 15 inches long (12.7 cm × 38.1 cm) and with the path location varying from plate to plate.

Once a path was marked, it was ground down with a hand held electric shop grinder. Coordinates were marked on the plates, so that the friction skid would be placed at the same spot in the test path for all pull tests for a particular plate. However, prior to the above work, all four test plates were oven dried overnight at 150° F. (65.5° C.).

Each plate was sprayed with 250 ml. of a particular liquid. The application of a particular chemical in its dry form is tabulated below:

| Plate No. | Chemical | Chemical Application Rate | |
| --- | --- | --- | --- |
| | | lb/ft$^2$ | kg/m$^2$ |
| 1 | Prilled $CaCl_2$ | 0.1137 | 0.5551 |
| | Pure $CaCl_2$ Equiv. | 0.1035 | 0.5053 |
| 2 | Flake $MgCl_2 \cdot$ 6HO | 0.1616 | 0.7840 |
| | Pure $MgCl_2$ Equiv. | 0.0737 | 0.3598 |
| 3 | Commercial NaCl | 0.0837 | 0.4086 |
| | Pure NaCl Equiv. | 0.0822 | 0.4013 |
| 4 | Plant $H_2O$ | -0- | -0- |

The 250 ml. of solution/water were retained on each plate for 30 minutes and then the excess liquid was removed. The plates were dried overnight for the initial coefficient of static friction tests at indoor ambient temperatures.

(2) First Static Friction Tests in Ambient Air

These tests were conducted in an air conditioned room, where testing ambient temperatures ranged from 70° F. (21.1° C.) to 72° F. (22.2° C.).

The static friction tests were performed once a day on each of the four chip seal test plates over a four day period. After each test, the plates were weighed to determine if there were any substantial losses of solution/water due to evaporation.

For each static friction test, the friction skid with two additional weights was placed in the 5 in.×15 in (2.7 cm×38.1 cm) test path and always at a specific spot, as determined by marked coordinate points for a particular chip seal test plate. For any chip seal plate, each test was comprised of pulling, i.e., applying a horizontal tension force on the friction skid five separate times. The tension force (kg), which was measured electronically, was recorded just when friction skid movement was observed. The five tension forces were averaged and the coefficient of static friction was calculated. A standard deviation determination was performed on each series of recorded tension forces.

Visual observations were made daily of the four plates and were recorded accordingly.

(3) Deicing and Static Friction Test at Sub-Freezing Temperatures

The temperatures for all of the tests in the refrigeration trailer ranged from 18.6° F. (−7.4° C.) to 29.5° F. (−1.4° C.).

The four chip seal test plates were placed in the trailer overnight. The normal series of static friction tests were performed on the cold dry test plates.

Each of the test paths were sprayed with 92 ml. of deionized water and allowed to freeze. The freezing occurred very rapidly. The 92 ml. of water is equivalent to 0.1 inches (0.254 cm) of water or about one inch (2.54 cm) of snow. After 45 minutes, the static friction tests commenced. Upon completion of these tests, the plates were allowed to remain in the trailer for another 30 minutes, before the next series of static friction tests were initiated.

After finalizing the above tests, the test plates were taken from the trailer and the iced test paths were washed with plant water in order to remove the ice. However, the water treated test plate remained m the trailer once the test path was frozen with deionized water. After the ice was removed from the other three test plates, they were returned to the trailer and immediately dry pared with paper towels. The static friction test were then performed on all three dried plates and the frozen water treated plate.

The testing procedure was repeated again with freezing deionized water on the test paths for 45 minutes followed by static friction tests. Another 30 minutes of freezing was allowed followed by another series of static friction tests.

Test Results (1) Purpose of Tests

The tests were designed to simulate four road surfaces layered with a coarse chip seal that were treated with deicing solutions and water. Treatment consisted of spraying the first surface with a $CaCl_2$, solution, the second surface with a MgCl2 solution, the third surface with a NaCl solution, and the fourth surface with non-potable plant water.

These chip seal surfaces were tested under ambient air and sub-freezing conditions to determine the coefficient of static friction.

(2) First Static Friction Test in Ambient Air

These tests were conducted over a four day period of temperatures varying from 70° F. (21.1° C.) to 72° F. (22.2° C.). The test plates were weighed each day. It was not evident that there was a loss or gain in weight. After the test plates were treated and allowed to ambient air dry, the following observations were made, as tabulated below:

| TEST PLATE | TREATMENT | TEST PATH APPEARANCE |
|---|---|---|
| 1 | $CaCl_2$ Soln. | Lustrous Sheen |
| 2 | $MgCl_2$ Soln. | Lustrous Sheen |
| 3 | NaCl Soln. | White Fine Salt Crystal Coating |
| 4 | Plant $H_2O$ | Dry Normal Surface |

Table-1 lists the results of the static friction tests. Although the $CaCl_2$ and $MgCl_2$ treated chip seal plates had a lustrous sheen, the coefficients of static friction were above unity (except for one 0.99-$MgCl_2$) and were favorably comparable to the dried water treated plate. Because of the fine crystal NaCl coating on the chips, it resulted in a slick surface and yielded the lowest coefficients of static friction.

TABLE 1

First Static Friction Test Series With Chip Seal Solution/$H_2O$ Treatment and Ambient Air Drying Chip Seal 15″ × 15″ (38.1 cm × 38.1 cm) Test Plates

| Test No. | No. 1 $CaCl_2$ | No. 2 $MgCl_2$ | No. 3 NaCl | No. 4 $H_2O$ |
|---|---|---|---|---|
| 1 | 2.50[1] | 2.18 | 1.90 | 2.34 |
|   | .02[2] | .01 | .02 | .02 |
|   | 1.20[3] | 1.04 | .91 | 1.12 |
| 2 | 2.56[1] | 2.34 | 1.63 | 2.53 |
|   | .14[2] | .15 | .13 | .12 |
|   | 1.22[3] | 1.12 | .78 | 1.21 |
| 3 | 2.24[1] | 2.33 | 1.86 | 2.36 |
|   | .18[2] | .26 | .12 | .20 |
|   | 1.07[3] | 1.11 | .89 | 1.13 |
| 4 | 2.14[1] | 2.07 | 1.52 | 2.41 |
|   | .29[2] | .07 | .11 | .06 |
|   | 1.02[3] | .99 | .73 | 1.15 |

[1] Tension-average of five pulls (Kg)
[2] Tension (Kg) std. deviation
[3] Coefficient of friction $\left(\frac{Avg\ Kg}{2.09}\right)$ where 2.09 is the total normal weight of the static friction block used.

(1) Tension—Average of Five Pulls (Kg)
(2) Tension (Kg) Std. Deviation
(3) Coefficient of Friction (Avg Kg/2.09) where 2.09 is the Total Normal Weight of the Static Friction Block Used.

These tests indicate that treatment with $CaCl_2$ and $MgCl_2$ solutions will not greatly effect the anti-skid properties of the instant coarse chip seal under normal dry conditions.

(3) Deicing and Static Friction tests as Sub-Freezing Temperatures

Although the tests were performed in temperatures varying from 18.6° F. (−7.4° C.) to 29.5° F. (−1.4° C.), the majority of the tests were done in the 24.0° F. (−4.4° C.) to 27.5° F. (−2.5° C.) range. The test plates were not subjected to any further treatment with $CaCl_2$, $MgCl_2$, or NaCl solutions.

By looking at the far right column of Table 2, under the coefficient of static friction, it is apparent the $CaCl_2$ treated test plate shows best overall performance for deicing and anti-skid properties. In test series B-1, the No. 3-NaCl plate showed the best deicing due to the initial action of the salt crystal coating. Once this coating was dissolved, the No. 3-NaCl plate began to lose its effectiveness in deicing and anti-skid properties.

After the test paths were frozen over with the deionized water, approximately 20 to 30 minutes were required before the $CaCl_2$, and Mg $Cl_2$ treated chips melted through +0.1 inch (0.25 cm) ice layer. In the A-1, B-1 and C-1 test series, ice remained between the protruding chip surfaces. In the case of the MgCl$_2$ chips, their flat surface tended to be wet while the CaCl$_2$ chip surfaces were mostly dry. This surface difference is reflected in the coefficients of static friction. However, there is misleading information when the coefficients of friction are compared between the MgCl$_2$ and NaCl treated test plates. After the Test Series B-2, the No. 3 NaCl test plate lost its deicing effectiveness for the test path remained frozen during the balance of test series and did not show any thawing during the 45 and 30 minute freezing times. The No. 2 MgCl$_2$ treated chips melted the ice layer, but the wet surface resulted in low coefficients of static friction, which were somewhat comparable to an icy surface. As a deicer, the MgCl$_2$ treated coarse chips were effective.

The A-4, B4, A-5, B-5 and C-5 CaCl$_2$ tests revealed an unexpected deicing action. The test path of the No. 1-CaCl$_2$ test plate was located along one side of the plate. Initially the test path was completely frozen. The CaCl$_2$ treated chips melted the ice between the chips and as a result of the entire test path was deiced. Apparently the $\frac{1}{4}$ inch (0.64 cm) round that formed the perimeter enclosure loosened and created an opening to allow water drainage. Apparently, if water from the melted ice is allowed to move, for example, down the road crown, the deicing is accelerated and more complete.

TABLE 2

Second Static Friction Test Series with Chip Seal Plates
Solution/H2O Treatment and testing Below Freezing Temperatures

| Plate No. And Treatment | Test Series | Temp. °F. (°C.) | Tested Surface Condition | Water Frozen (ml) | Freeze Time (min.) | Coeff. Static Friction |
|---|---|---|---|---|---|---|
| No. 1-CaCl$_2$ | A-1 | 20.5 (−6.4) | CD | 0 | 0 | 1.27 |
| No. 2-MgCl$_2$ | | 20.2 (−6.5) | CD | 0 | 0 | .93 |
| No. 3-Nacl | | 19.3 (−7.1) | CD | 0 | 0 | .84 |
| No. 4-H$_2$O | | 18.6 (−7.4) | CD | 0 | 0 | 1.11 |
| No. 1-CaCl$_2$ | B-1 | 28.0 (−2.2) | SS-FC | 92 | 45 | .98 |
| No. 2-MgCl$_2$ | | 27.5 (−2.5) | WS-FC | 92 | 45 | .93 |
| No. 3-NaCl | | 27.0 (−2.7) | WS-FC | 92 | 45 | 1.07 |
| No. 4-H$_2$O | | 27.0 (−2.7) | SFZ | 92 | 45 | .64 |
| No. 1-CaCl | C-1 | 22.0 (−5.5) | DS-FC | NWA | 30 | 1.44 |
| No. 2-MgCl$_2$ | | 22.0 (−5.5) | SS-FC | NWA | 30 | .96 |
| No. 3-NaCl | | 22.0 (−5.5) | WS-FC | NWA | 30 | 1.00 |
| No. 4-H$_2$O | | 23.0 (−5.0) | SFZ | NWA | 30 | .57 |
| No. 1-CaCl$_2$ | A-2 | 27.0 (−2.7) | WA-CD | 0 | 0 | 1.47 |
| No. 2-MgCl$_2$ | | 27.0 (−2.7) | WA-CD | 0 | 0 | .97 |
| No. 3-NaCl | | 26.5 (−3.1) | WA-CD | 0 | 0 | .91 |
| No. 4-H$_2$O | | 26.0 (−3.3) | SFZ | OIS | 0 | .80 |
| No. 1-CaCl$_2$ | B-2 | 21.0 (−6.1) | SS-FC | 92 | 45 | 1.47 |
| No. 2-MgCl2 | | 20.5 (−6.4) | WS-FC | 92 | 45 | .51 |
| No. 3-NaCl | | 20.5 (−6.4) | SS-FC | 92 | 45 | .77 |
| No. 4-H$_2$O | | 21.0 (−6.1) | SFZ | OIS | 45 | .81 |
| No. 1-CaCl$_2$ | C-3 | 24.5 (−4.2) | DS-FC | NWA | 30 | 1.34 |
| No. 2-MgCl$_2$ | | 24.0 (−4.4) | SFZ | NWA | 30 | .70 |
| No. 3-NaCl | | 24.5 (−4.2) | SFZ | NWA | 30 | .71 |
| No. 4-H$_2$O | | 24.5 (−4.2) | SFZ | OIS | 30 | .60 |

(For Plate Nos. 1, 2, and 3 the Surface was washed and Cold Dried Plate 4 retained its original ice surface. No CSF Tests were performed.

| Plate No. And Treatment | Test Series | Temp. °F. (°C.) | Tested Surface Condition | Water Frozen (ml) | Freeze Time (min.) | Coeff. Static Friction |
|---|---|---|---|---|---|---|
| No. 1-CaCl$_2$ | B-3 | 29.5 (−1.4) | SS-FC | 92 | 45 | 1.19 |
| No. 2-MgCl$_2$ | | 29.5 (−1.4) | SS-FC | 92 | 45 | 1.18 |
| No. 3-NaCl | | 29.5 (−1.4) | SFZ | 92 | 45 | .62 |
| No. 4-H$_2$O | | 29.5 (−1.4) | SFZ | OIS | 45 | .84 |
| No. 1-CaCl$_2$ | C-3 | 24.0 (−4.2) | DS-FC | NWA | 30 | 1.20 |
| No. 2-MgCl$_2$ | | 24.0 (−4.2) | SS-FC | NWA | 30 | .95 |
| No. 3-NaCl | | 24.0 (−4.2) | SFZ | NWA | 30 | .78 |
| No. 4-H$_2$O | | 24.0 (−4.2) | SFZ | OIS | 30 | .70 |
| No. 1-CaCl$_2$ | A-4 | 27.5 (−2.5) | WA-CD | 0 | 0 | 1.22 |
| No. 2-MgCl$_2$ | | 27.5 (−2.5) | WA-CD | 0 | 0 | .88 |
| No. 3-NaCl | | 27.5 (−2.5) | WA-CD | 0 | 0 | .90 |
| No. 4-H$_2$O | | 27.0 (−2.7) | WA-CD | 0 | 0 | .78 |
| No. 1-CaCl$_2$ | B-4 | 25.0 (−3.9) | DS-MB | 92 | 45 | 1.02 |
| No. 2-MgCl$_2$ | | 25.0 (−3.9) | SS-FC | 92 | 45 | .75 |
| No. 3-NaCl | | 25.0 (−3.9) | SFZ | 92 | 45 | .77 |
| No. 4-H$_2$O | | 28.0 (−2.2) | SFZ | 92 | 45 | .66 |
| No. 1-CaCl$_2$ | C-4 | 24.5 (−4.2) | DS-MB | NWA | 30 | .90 |
| No. 2-MgCl$_2$ | | 24.0 (−4.4) | SS-FC | NWA | 30 | .69 |
| No. 3-NaCl | | 24.0 (−4.4) | SFZ | NWA | 30 | .88 |
| No. 4-H$_2$O | | 25.0 (−3.9) | SFZ | NWA | 30 | .78 |
| No. 1-CaCl$_2$ | A-5 | 25.5 (−3.6) | WA-CD | 0 | 0 | 1.05 |
| No. 2-MgCl$_2$ | | 25.5 (−3.6) | WA-CD | 0 | 0 | 1.05 |
| No. 3-NaCl | | 25.5 (−3.6) | WA-CD | 0 | 0 | .78 |
| No. 4-H$_2$O | | 24.0 (−4.4) | Add H$_2$O OIS(1) | OIS(1) | 0 | — |
| No. 1-CaCl$_2$ | B-5 | 27.0 (−2.7) | DS-MB | 92 | 45 | .91 |
| No. 2-MgCl$_2$ | | 27.0 (−2.7) | SS-FC | 92 | 45 | .78 |
| No. 3-NaCl | | 27.0 (−2.7) | SFZ | 92 | 45 | .79 |
| No. 4-H$_2$O | | 27.0 (−2.7) | SFZ | OIS | 45 | .52 |
| No. 1-CaCl$_2$ | C-5 | 26.0 (−3.3) | DS-MB | NWA | 30 | 1.11 |
| No. 2-MgCl$_2$ | | 26.0 (−3.3) | SS-FC | NWA | 30 | .73 |
| No. 3-NaCl | | 26.0 (−3.3) | SFZ | NWA | 30 | .78 |

TABLE 2-continued

Second Static Friction Test Series with Chip Seal Plates
Solution/H2O Treatment and testing Below Freezing Temperatures

| Plate No. And Treatment | Test Series | Temp. °F. (°C.) | Tested Surface Condition | Water Frozen (ml) | Freeze Time (min.) | Coeff. Static Friction |
|---|---|---|---|---|---|---|
| No. 4-H$_2$O | | 26.0 (−3.3) | SFZ | OIS | 30 | .57 |

Legend:
CD = Cold Dried
SS = Slightly Wet Chip Surface
FC — Frozen Between Chips
WS — Wet Chip Surface
SFZ = (All) Surface Frozen
WA = (Surface) Washed
DS — Dry Chip Surface
PW = Plus Slight Water
NWA = No Water Added
OIS = Original Ice Surface
MB = Ice melted between chips
NOTE (1): 30 ml Added to be Frozen The entire surface of the test plates were treated. When the test paths were sprayed with deionized water to from the ice coating, other sections of the CaCl$_2$ and MgCl$_2$ plates were also sprayed and frozen. These sections contained the coarse chips which were not ground to from the flat surfaces. The test paths with flat ground chip surfaces always resulted in deicing, but the unground chips remained frozen.

The No. 1, No. 2, and No. 3 test plates went through five wash/dry/freeze/thaw cycles. The No. 3 NaCl treated test plate lost its deicing effectiveness after 1½ cycles. However, the No. 1-CaCl$_2$, and No. 2-MgCl$_2$ test plates were still very productive in deicing after five cycles.

In view of the favorable test results reported above, an experimental field test was jointly conducted with the Colorado Department of Transportation. The focus of these tests of the lightweight aggregate chip seal impregnated with deicing media was to evaluate onroad performance and verify laboratory results.

A one quarter mile (0.42 km) stretch of two different state highways was treated in mid-October.

These sections were treated with a MgCl$_2$ solution with a 28% concentration level. The MgCl$_2$ application utilized a Bear Cat ™ liquid laydown tanker which incorporated automated liquid lay down application rates.

The application rate of the MgCl$_2$ was held constant at 0.15 gallons per square yard (0.68 liters/m$^2$).

Initial observations were as follows:
1. The lightweight aggregate chipseal was able to absorb the full volume of MgCl$_2$ applied with no visible runoff.
2. The roadway was able to absorb the MgCl$_2$ solution within 30 to 45 minutes of application.
3. Roadway traction was not impaired.
4. Initial de-icing performance was satisfactory.
5. Due to moderate weather, multi-cycle performance (in excess of 5 storms) has not been determined.

Based on performance from the first road test series, a second series of test were initiated.

Two new test sites were selected; the first was an interstate highway service road, the second was a state highway. Both test sections were ¼ mile in length (0.42 km) and included adjoining lanes and shoulders.

The second series of tests were initiated in November utilizing the same Bear Cat laydown tanker from the October test. The de-icing media for this test was CaCl$_2$-35% solution in lieu of the MgCl$_2$-28% solution utilized in the earlier test. The application rate on the state highway was 0.15 gallons per square yard (0.68 liters/m$^2$) and 0.30 gallons per square yard (1.35 liters/m$^2$) on the interstate.

Observations were as follows:
1. The lightweight aggregate chipseal was able to absorb the full volume of CaCl$_2$ applied at both application rates, with no visible runoff.
2. The roadway was able to absorb the CaCl$_2$ solution within 30 to 45 minutes of application.
3. Roadway traction was not impaired.
4. Initial de-icing performance through a second storm was satisfactory and evaluated by Colorado Department of Transportation personnel as superior in anti-icing performance.
5. Due to moderate weather, multi-cycle performance (in excess of 5 storms) has not been determined.

The selection of the carrier materials for the lightweight aggregate chipseal application is, of course, a function of the climate, traffic volume and speed, existing surface conditions, available funds etc. Especially useful are the current high float rapid and medium set polymerized emulsions. Typical oil rates in common use for chipseals center around 0.35–0.38 gallons per square yard (1.6–1.7 liters/m$^2$) of roadway surface. Typical lightweight aggregate coverage rates may range between 100–120 square yards per cubic yard (110–132 m$^2$/m$^3$) of road surface.

An alternative to the spraying of the deicing solution onto the chipseal overlay would be a soaking of the lightweight aggregate prior to its insertion into the oil, asphalt or concrete carrier. By saturating the aggregate with the deicer, the resultant chipseal is then ready to deice without an initial major deicer spraying. Touch up spraying may be needed but the fresh chipseal is ready to act upon the snow and ice.

While in accordance with the provisions of the statue, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A renewable in-situ deicing composition for thoroughfares, the composition consisting essentially of a lightweight, porous, expanded shale aggregate, the aggregate renewably saturated with a deicer selected from the group consisting of calcium chloride, magnesium chloride, potassium chloride, sodium chloride, magnesium acetate, calcium acetate and calcium magnesium acetate, and the aggregate admixed with a carrier selected from the group consisting of oil, asphalt and concrete.

2. The composition according to claim 1 wherein the aggregate constitutes about 40% of the carrier.

3. A method for renewing a deicing composition incorporated in a thoroughfare, the method comprising:
 a) depositing upon the thoroughfare a deicing composition consisting essentially of a lightweight, porous, expanded shale aggregate, the aggregate renewably saturated with a deicer selected from the group consisting of calcium chloride, magnesium chloride, potassium chloride, sodium chloride, magnesium acetate, calcium acetate and calcium magnesium acetate, and the aggregate admixed with a carrier selected from the group consisting of oil, asphalt and concrete; and
 b) replenishing the deicer when it becomes depleted by introducing additional deicer to the deicing composition deposited on the thoroughfare.

4. The method according to claim 3 including replenishing the depleted deicer per step b) by spraying additional deicer over the thoroughfare.

5. The method according to claim 3 including replenishing the depleted deicer per step b) by introducing the deicer to the thoroughfare at a rate of about 0.15 to 0.30 gallons per square yard (0.68–1.35 liters/m$^2$).

6. The method according to claim 3 wherein the aggregate constitutes about 40% of the composition.

* * * * *